Dec. 29, 1942.    R. L. MUTLOW    2,306,829
COLLAR HOLDER
Filed March 31, 1941    2 Sheets-Sheet 1

INVENTOR
Raymond L. Mutlow
BY
Nathaniel Frucht
ATTORNEY

Patented Dec. 29, 1942

2,306,829

UNITED STATES PATENT OFFICE 2,306,829

COLLAR HOLDER

Raymond L. Mutlow, Attleboro, Mass.

Application March 31, 1941, Serial No. 386,040

6 Claims. (Cl. 24—81)

My present invention relates to the jewelry art, and has particular reference to the construction of collar holders.

It is the principal object of my invention to provide an improved construction for a collar holder, which is more readily positioned for use, and is more easily removed.

Another object of the invention is to provide a collar holder of increased gripping power.

Still another object is to utilize a manually engageable lever control for a collar holder.

A further object is to provide a collar holder construction which utilizes leaf spring elements.

With the above and other objects and advantageous features in view, the invention consists of a novel arrangement of parts more fully disclosed in the detailed description following, in conjunction with the accompanying drawings, and more specifically defined in the claims appended thereto.

Figure 1:
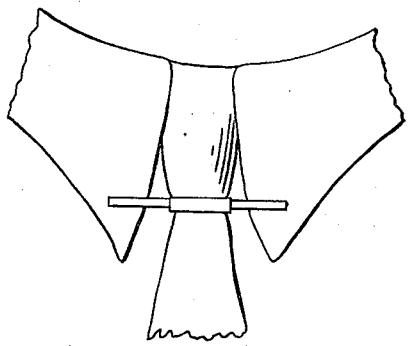
Fig. 1 is a view showing the novel collar holder as in use.
Figure 2:
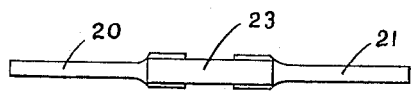
Fig. 2 is a plan view thereof.

It has been found desirable to provide an improved collar holder which utilizes leaf spring and manually operative lever parts, whereby greater ease in mounting and in removing the collar holder and greater holding pressure is obtained. To this end, I utilize an upper ornamental bar to which a leaf spring member is connected, a manually operative lever device being associated with each end of the leaf spring to exercise a collar tab grip in conjunction with the associated upper bar end.

Referring to the drawings, the novel collar holder 20 consists of an ornamental upper bar 21 which has secured thereto a leaf spring 22 by any suitable means, such as by a tubular band 23. The rear surface of the upper bar is provided with projections 24 which may be formed by struck portions or by securing or soldering tabs thereto, to extend towards the upper surface of the ends of the leaf springs and cause divergence of the ends of the upper bar and the leaf spring ends.

Each end of the leaf spring 22 is formed with outwardly extending lock tongues 25; associated with each end is a lever device 26 having a shank 27 which is preferably formed with an upper projecting rib 28, a manually engageable finger tab 29, and an end roll 30 which has a socket 31 for receiving the associated leaf spring tongue 25. Both the spring ends and the lever devices are provided with rivet holes 32 for receiving lock rivets 33; other securing means may be used if desired, or the spring leaf and the lever devices may be made of one piece of resilient stock.

Figure 3:
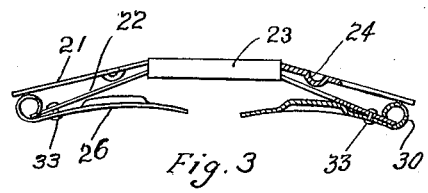
Fig. 3 is a side view thereof, partly in section.
Figure 4:
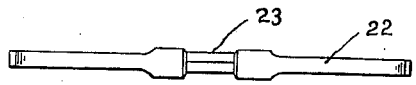
Fig. 4 is a bottom view thereof.
Figure 5:
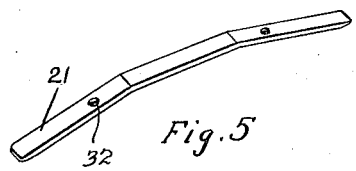
Figs. 5, 6 and 7 are perspective views of the structural elements therefor.
Figure 6:
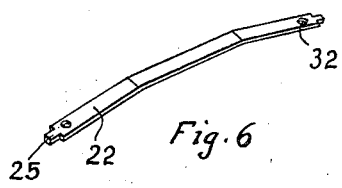
Figure 7:
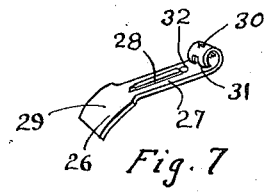

The parts being assembled as shown in Fig. 3, the improved collar holder has a gripping action at each end between the rolls 30 and the ends of the upper bar; the lever devices 26 when pressed at the tabs will open the gripping action against the pressure of the leaf spring.

Figure 8:
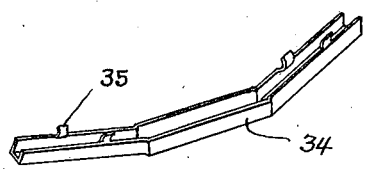
Fig. 8 is a perspective view of an ornamental cover for the collar holder.

If desired, an ornamental cover of any suitable material, as for example molded products of any color, may be provided. An illustrative example is shown in Fig. 8, wherein a cover 34 has spring fingers 35 for snapping gripping engagement with the sides of the upper ornamental bar.

Figure 9:
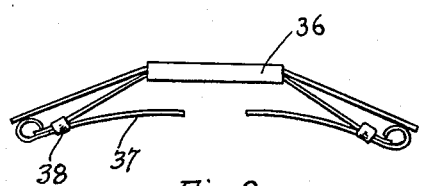
Fig. 9 is a side view of a modified form.
Figure 10:
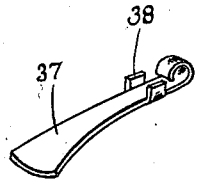
Fig. 10 is a perspective view of one lever therefor.

Any desired form of lever device may be used; in the modification shown in Fig. 9, the collar holder 36 has lever devices 37 which are provided with lock tabs 38 for locking to the leaf spring ends.

Figure 11:
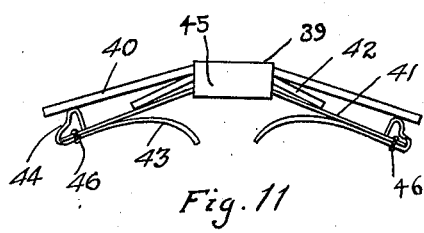
Fig. 11 is a side view of a further modified form.
Figure 12:
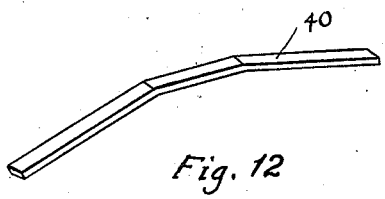
Figs. 12 to 15 are perspective views of the structural elements therefor.
Figure 13:
Figure 14:
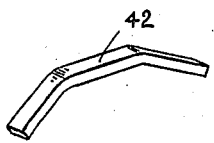
Figure 15:
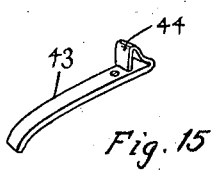

Another modified construction is shown in Fig. 11; this collar holder 39 is designed for more accurate control of the spring pressure, and includes an upper ornamental bar 40, a spring bar 41, an intermediate bar 42 which has its length set to obtain a desired spring pressure, and a lever device 43 which has a pressure roll 44, the parts being assembled by means of a central band 45 and rivets 46, as illustrated in Fig. 11. The arrangement also increases the length of the collar tab receiving space.

Figure 16:
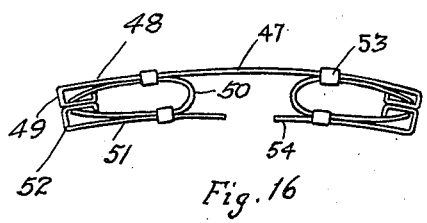
Fig. 16 is a side view of still another modified form.
Figure 17:
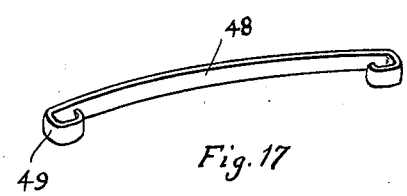
Figs. 17, 18 and 19 are perspective views of the structural elements therefor.
Figure 18:
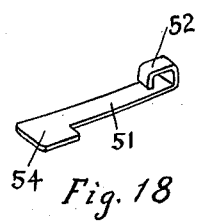
Figure 19:
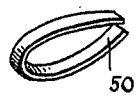

Still another modified form is shown in Fig. 16, which utilizes two U-shaped spring elements. The collar holder 47 includes a top bar 48 having its ends bent to provide end sockets 49, two U-shaped springs 50, and two lever devices 51, which have their ends bent to provide end sockets 52, the spring ends being received in the end sockets, and the parts being secured together by means of bands 53. Pressure on the end tabs 54 of the lever devices, which extend back of the springs 50, separates the sockets of the upper bar and the lever devices, which function as collar tab grips.

Although specific constructions have been described and illustrated, it is obvious that changes in the size, shape and arrangement of the parts may be made to meet the requirements for different collar holder designs, within the spirit and the scope of the invention as defined in the appended claims.

I claim:

1. In a collar holder construction, an upper ornamental bar, spring leaf means secured to said bar centrally thereof and having its ends resiliently urged towards the ends of said bar, and lever devices secured to said spring leaf means at each end thereof, said lever devices comprising a body portion having a finger engageable part at the inner end and a roll portion at the outer end, said lever devices being secured to the spring leaf means to normally resiliently engage the roll portions with the back of the upper bar.

2. In a collar holder construction, an upper bar, an ornamental facing removably secured thereto, spring leaf means secured to said bar centrally thereof and having its ends resiliently urged towards the ends of said bar, and lever devices secured to said spring leaf means at each end thereof, said lever devices comprising a body portion having a finger engageable part at the inner end and a roll portion at the outer end, said lever devices being secured to the spring leaf means to normally resiliently engage the roll portions with the back of the upper bar.

3. In a collar holder construction, an upper ornamental bar, spring leaf means secured to said bar centrally thereof and having its ends resiliently urged towards the ends of said bar, lever devices secured to said spring leaf means at each end thereof, said lever devices and the ends of the bar having cooperating parts constituting collar tab grips, and having manually engageable portions movable to seperate said gripping parts against the tension of the spring leaf means, and means interposed between said bar and said spring leaf means to obtain a predetermined spring pressure.

4. In a collar holder construction, an upper ornamental bar, spring leaf means secured to said bar centrally thereof and having its ends resiliently urged towards the ends of said bar, lever devices secured to said spring leaf means at each end thereof, said lever devices and the ends of the bar having cooperating parts constituting collar tab grips, and having manually engageable portions movable to separate said gripping parts against the tension of the spring leaf means, and means comprising an auxiliary bar interposed between said bar and said spring leaf means to obtain a predetermined spring pressure.

5. In a collar holder construction, an upper ornamental bar, spring leaf means secured to said bar centrally thereof and having its ends resiliently urged towards the ends of said bar, and lever devices secured to said spring leaf means at each end thereof, said lever devices and the ends of the bar having cooperating parts constituting collar tab grips, and having manually engageable portions movable to separate said gripping parts against the tension of the spring leaf means, said bar having spacing elements extending therefrom and contacting the ends of the spring leaf means whereby the ends of the spring leaf means are spaced from the ends of said bar.

6. In a collar holder construction, an upper ornamental bar, spring leaf means comprising an elongated leaf member secured to said bar centrally thereof and having its ends resiliently urged towards the ends of said bar, and lever devices secured to said spring leaf means at each end thereof, said lever devices and the ends of the bar having cooperating parts constituting collar tab grips, and having manually engageable portions movable to separate said gripping parts against the tension of the spring leaf means, said bar having spacing elements extending therefrom and contacting the ends of the spring leaf means whereby the ends of the spring leaf means are spaced from the ends of said bar.

RAYMOND L. MUTLOW.